United States Patent [19]
Snyder et al.

[11] Patent Number: 6,035,221
[45] Date of Patent: *Mar. 7, 2000

[54] SPEAKER PHONE MODULE CONNECTABLE TO EITHER A CELLULAR TELEPHONE OR BATTERY CHARGER

[75] Inventors: Tom Snyder; Patrik Lilja, both of Raleigh; Tim Banyas, Apex; Christopher T. Collins, Gary, all of N.C.

[73] Assignee: Ericsson Inc., Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/783,578

[22] Filed: Jan. 15, 1997

[51] Int. Cl.[7] ..................................................... H04Q 7/20
[52] U.S. Cl. ........................... 455/569; 455/575; 455/90; 455/573
[58] Field of Search ............................... 455/569, 90, 347, 455/575, 573, 550; 379/441, 419, 420, 428, 432

[56] References Cited

U.S. PATENT DOCUMENTS

| | | |
|---|---|---|
| 4,661,992 | 4/1987 | Garay et al. ............................... 455/90 |
| 5,333,176 | 7/1994 | Burke et al. ............................. 455/569 |
| 5,457,814 | 10/1995 | Myrskog et al. ........................ 455/569 |
| 5,754,962 | 5/1998 | Griffin ..................................... 455/569 |
| 5,790,960 | 8/1998 | Miyashita ................................ 455/575 |
| 5,802,167 | 9/1998 | Hong ......................................... 455/90 |
| 5,809,432 | 9/1998 | Yamashitia .............................. 455/575 |
| 5,828,966 | 10/1998 | Davis et al. ............................... 455/90 |

*Primary Examiner*—Dwayne D. Bost
*Assistant Examiner*—Nay Maung
*Attorney, Agent, or Firm*—Jenkens & Gilchrist, P.C.

[57] ABSTRACT

A speaker phone module is disclosed. The module includes a housing defining a cradle for removably receiving a cellular telephone battery charger. The housing further encloses speaker phone circuitry for interconnecting a cellular telephone within the battery charger to a microphone and speaker within the housing. A connector within the cradle provides means for electrically connecting the speaker phone circuitry to the battery charger.

19 Claims, 4 Drawing Sheets

SPEAKER PHONE MODULE CONNECTABLE TO EITHER A CELLULAR TELEPHONE OR BATTERY CHARGER

BACKGROUND OF THE INVENTION

1. Technical Field of the Invention

The present invention relates to speaker phones, and more particularly, to a speaker phone module which is connectible to a cellular telephone or battery charger.

2. Description of Related Art

Due to their relatively small size, in order for users to use a cellular telephone for conference calls involving a large number of people, speaker phone accessories have been developed into which a cellular telephone is plugged in order to provide speaker phone capabilities. Existing speaker phone units involve speaker phone circuitry that is built into a cellular battery recharging unit. The recharging units are generally desktop chargers (meaning they charge a battery on the phone only) or multi-chargers (meaning that additionally they can charge a spare battery of the phone). This design greatly limits a consumer's choice with respect to speaker phone electronics.

With this configuration a purchaser must decide to purchase either a charger only or a charger/speaker phone combination unit. A choice between one or the other is not available. If a purchaser were to buy a charger and later decide they wanted a speaker phone, they would be required to essentially re-buy the charger in order to obtain speaker phone functionality. There does not presently exist in the art a modular add-on accessory enabling a user to add speaker phone capabilities to an existing battery charger unit or to utilize a speaker phone without a battery charger. A device of this type would greatly benefit the consumer.

SUMMARY OF THE INVENTION

The present invention overcomes the foregoing and other problems with a modular speaker phone apparatus. The apparatus consists of a housing that defines a cradle for removably receiving a battery charger. The housing encloses speaker phone circuitry enabling interconnection between a microphone and a speaker connected within the housing to a cellular telephone resting within the battery charger.

In an alternative embodiment, the cradle may be configured to receive either a battery charger or a cellular telephone. A connector is integrally positioned within the cradle to electrically connect the speaker phone module to the battery charger or cellular telephone resting within the cradle of the housing. In the case of a battery charger, the connection acts as a power connector between the cellular telephone module and the battery charger. When a cellular telephone rests within the cradle, the connection acts as a data transfer port between the cellular telephone and the speaker phone module. An external connector provides connection to either an external power or a data source, or other peripheral accessory. The alternative embodiment further includes a housing which may be located in a first or second position. When placed in the first position the housing provides a first surface for supporting a battery charger connected to the connector within the cradle. When placed in the second position, the housing provides a narrower second surface for supporting the base of a cellular telephone and interconnecting the connector with the cellular telephone. In both configurations, a microphone is facing upward or forward to ease reception of audio signals.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1A:
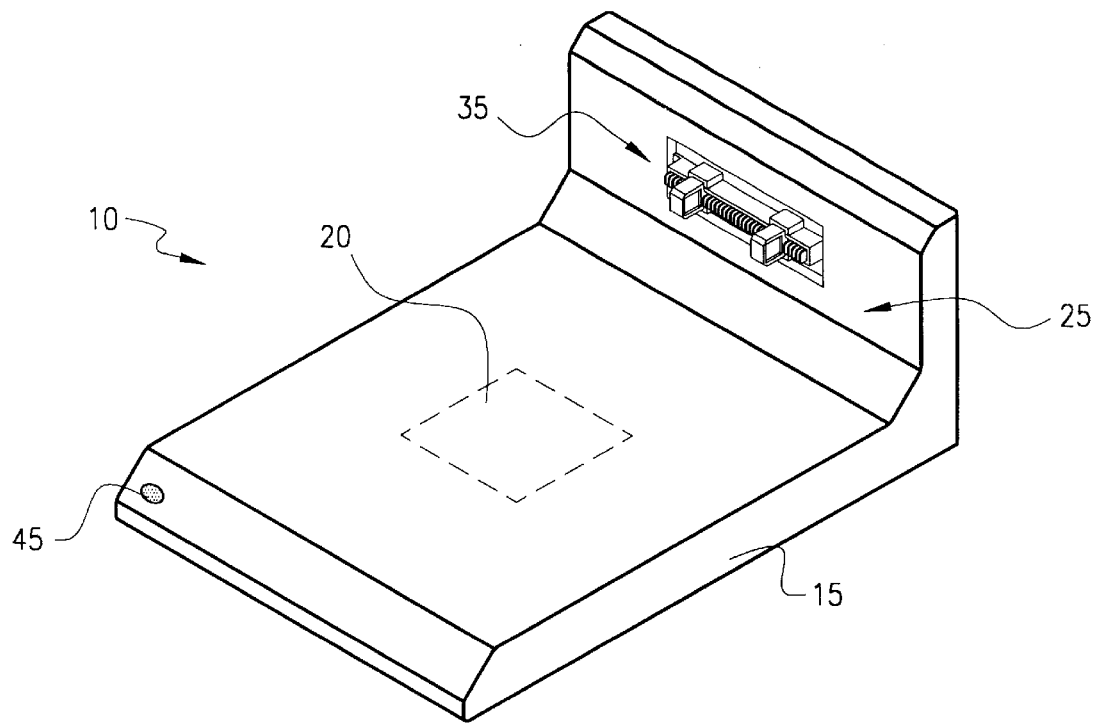
FIG. 1A is a perspective view of the front side of an embodiment the speaker phone module.
Figure 1B:
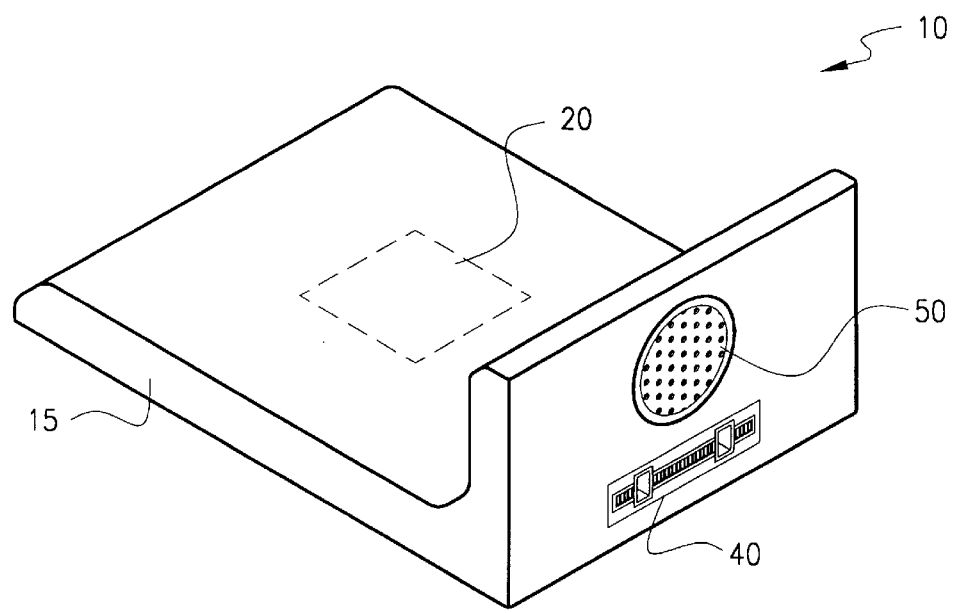
FIG. 1B is a perspective view of the rear side of an embodiment the speaker phone module.
Figure 2:
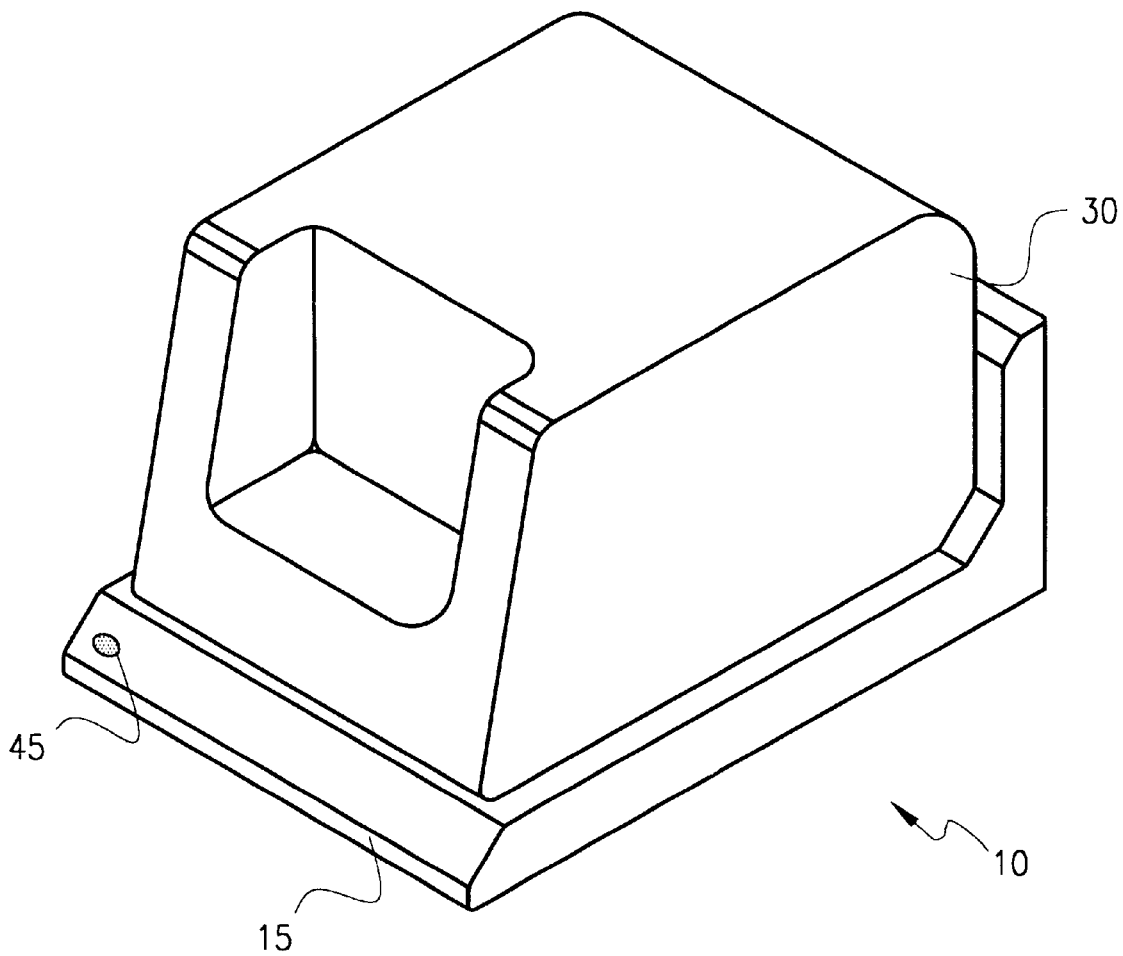
FIG. 2 is a perspective view of the battery charging unit mated with an embodiment the speaker phone module.

Referring now to the drawings, and more particular to FIGS. 1A and 1B, there are illustrated perspective front and rear views of the speaker phone module 10 of the present invention. The speaker phone module 10 includes an exterior housing 15 that encloses internal speaker phone circuitry 20 (shown generally in phantom). The housing 15 may consist of preformed plastic or any other material capable of supporting a cellular telephone or battery charger and protecting the speaker phone circuitry 20. The housing 15 is generally l-shaped and defines a cradle 25 configured to removably receive a battery charger 30 as shown generally in FIG. 2. The cradle 25 as shown in FIGS. 1A and 1B comprises a flat surface for receiving the battery charger 30. However, it should be realized that any configuration enabling a battery charger 30 to be associated with a speaker phone module 10 would be acceptable for the cradle 25.

Integrally located within the cradle 25 is a connector 35 for providing an electrical connection between the battery charger 30 and the speaker phone circuitry 20. The connector 35 is positioned to mechanically mate with a charger 30, such as a multicharger. A multicharger may charge a phone and a battery at the same time. In a preferred environment, the connector 35 is a male 12 pin connector which engages the power jack on a multicharger 30. An additional connector 40 enables the speaker phone module 10 to be interconnected with power, data or other peripheral accessories external to the module 10. In the preferred embodiment, the connector 40 comprises a 12 pin female connector.

The speaker phone module 10 further includes a microphone 45 for receiving and forwarding speech from a user to a cellular telephone placed within the charger 30 or directly plugged into the speaker phone module 10. A speaker 50 provides audio broadcast of audio signals received over a cellular telephone placed within the battery charger 30 or directly connected to the speaker phone module 10. The speaker 50 and microphone 45 are appropriately spaced to prevent unwanted feedback and work in conjunction with the speaker phone circuitry 20.

Figure 3:
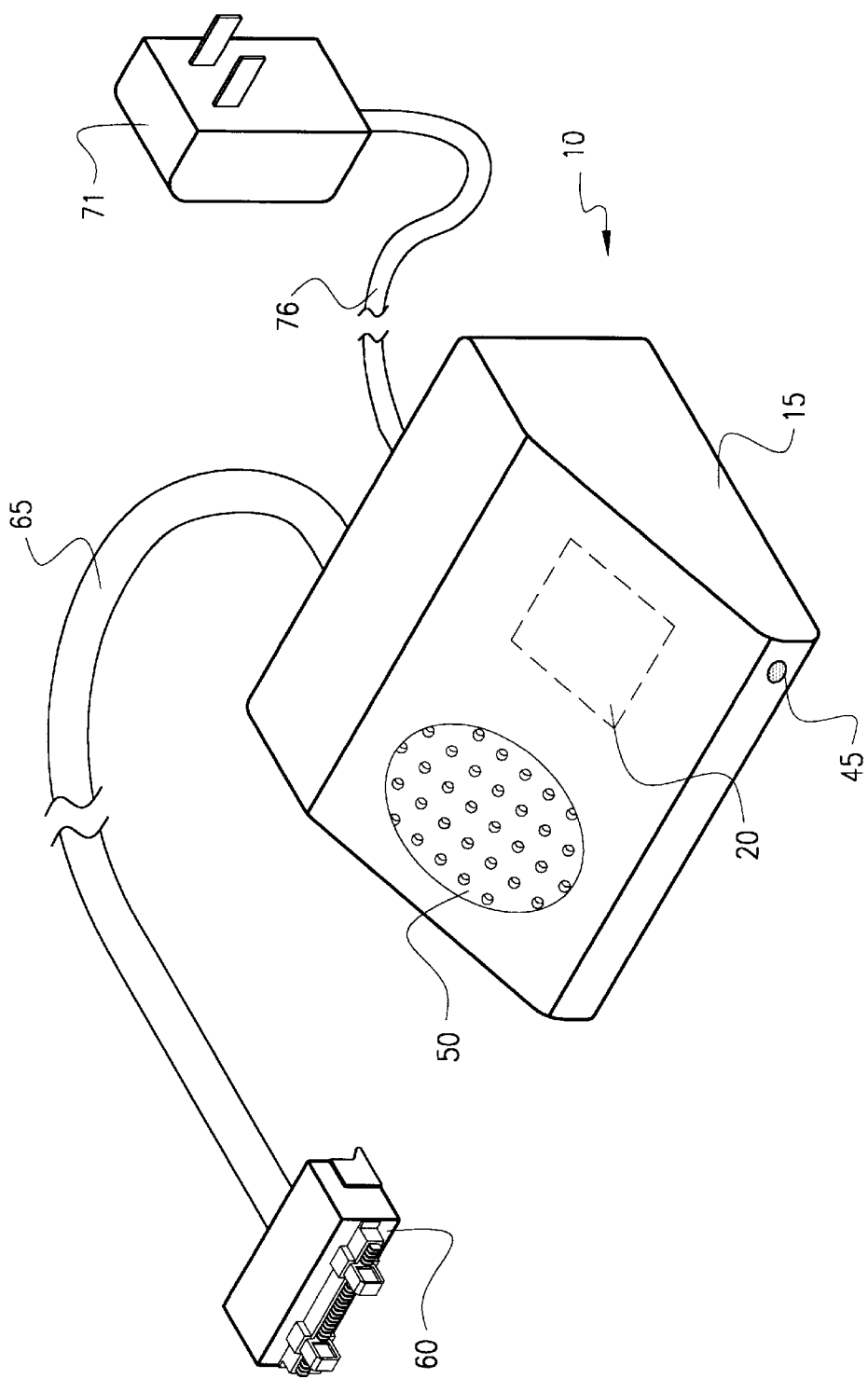
FIG. 3 is a view of an alternative embodiment of the speaker phone module.

Referring now to FIG. 3, there is illustrated an alternative embodiment of the present invention wherein the speaker phone module housing 15 encloses the speaker phone circuitry 20 and includes a speaker 50 and microphone 45 associated therewith. This embodiment however includes no cradle for receiving a battery charger 30. Instead, a connector 60 for interconnecting the speaker phone module 10 with a battery charger or cellular telephone is connected to the housing 15 and speaker phone circuitry 20 via a cable 65. This provides a more flexible design and enables the speaker phone module 10 to function with any battery charger or cellular telephone having a connector capable of mating with the connector 60. Additionally, an AC/DC adapter 71 or data or other peripheral accessory may be plugged into the module 10 via an extension cord 76.

Figure 4A:
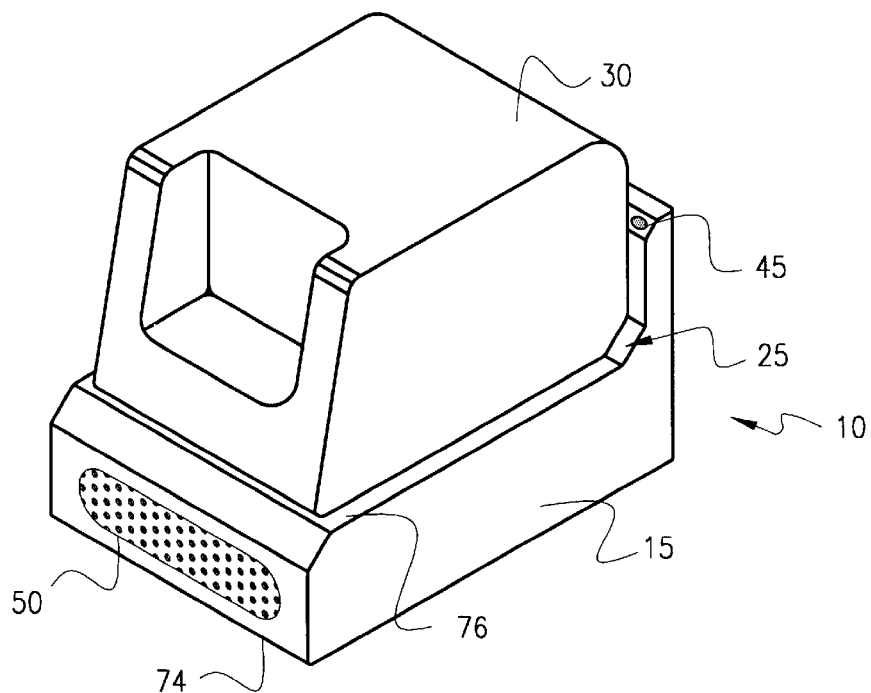
FIGS. 4A and 4B are perspective views of a speaker module capable of receiving within its cradle either a battery charger unit or a cellular telephone.
Figure 4B:
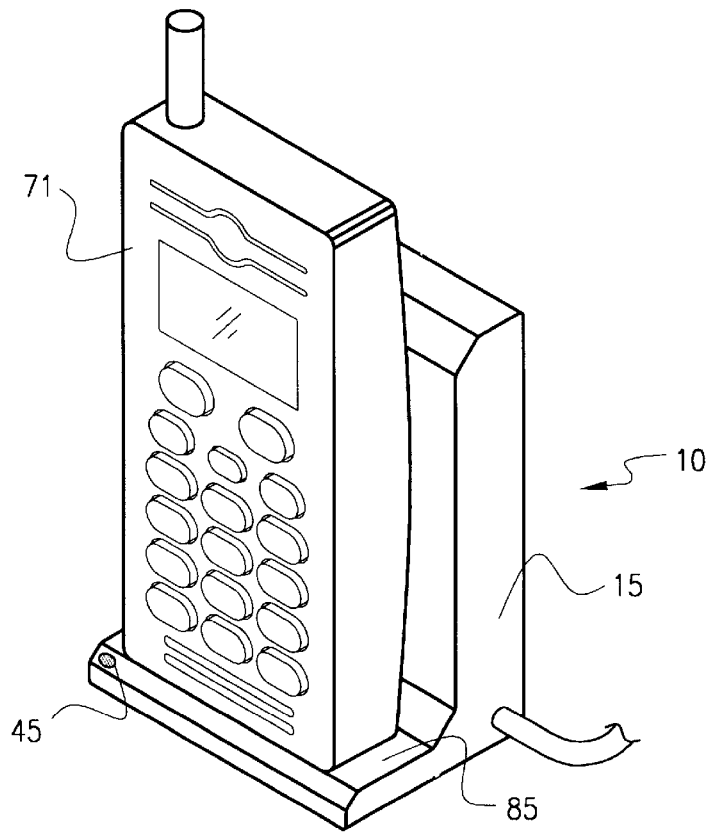

Referring now to FIGS. 4A and 4B there is illustrated a speaker phone module 10 having a cradle 25 capable of receiving both a battery charger 30 and a cellular telephone 71. In a first configuration as shown in FIG. 4A, the speaker phone module 10 is placed on a back surface 74 such that the battery charger 30 is supported by wide surface 76. The battery charger 30 is interconnected with the speaker phone 10 via a connector 35 (FIG. 1A) as described previously with respect to FIG. 1A. The connector 35 is strategically placed on surface 85 to enable it to engage a corresponding connector on the back of a battery charger 30 in the first configuration or to engage a corresponding connector on the base of a cellular telephone 70 in a second configuration.

FIG. 4B illustrates a second configuration wherein the speaker phone module 10 may be placed on a narrow surface 85 such that the cellular telephone 71 rests upon the ledge 80 and against surface 76 in an upright position to be easily seen. The connector 35 engages a corresponding connector within the cellular telephone. In order for the speaker phone module 10 to be able to support both a cellular telephone and a battery charger, the cradle 25 must be configured in such a manner that the bodies of both the battery charger 30 and cellular telephone 71 will fit within the cradle. A microphone 45 is located such that the receiver is always upwardly or forwardly presented.

The previous description is of a preferred embodiment for implementing the invention, and the scope of the invention should not necessarily be limited by this description. The scope of the present invention is instead defined by the following claims.

What is claimed is:

1. A speaker phone module, comprising:
    a housing defining a cradle for removably receiving a portable battery charger, said housing enclosing speaker phone circuitry;
    a microphone connected to the speaker phone circuitry for receiving an audio signal to be transmitted to a cellular phone placed within the portable battery charger;
    a speaker connected to the speaker phone circuitry for broadcasting audio signals received from the cellular phone placed within the portable battery charger; and
    means for electrically connecting the speaker phone module to the portable battery charger received within the cradle of the housing.

2. The speaker phone module of claim 1 further comprising means for connecting the module to different types of peripheral accessories.

3. The speaker phone module of claim 1 wherein the peripheral accessory comprises an external data source.

4. The speaker phone module of claim 1 wherein the peripheral accessory comprises an external power source.

5. The speaker phone module of claim 1 wherein the means for electrically connecting comprises a connection integral with the cradle of the housing.

6. The speaker phone module of claim 1 wherein the cradle supports either the portable battery charger or a cellular telephone.

7. A speaker phone module, comprising:
    a housing defining a cradle for removably receiving both a battery charger and a cellular telephone but not at the same time, said housing enclosing speaker phone circuitry;
    a speaker connected to the speaker phone circuitry for broadcasting audio signals received from the cellular telephone within the cradle of the housing;
    a microphone connected to the speaker phone circuitry for processing and transmitting to the cellular telephone within the cradle of the housing;
    a connector within the cradle for electrically connecting the speaker phone circuitry with both the cellular telephone or the battery charger.

8. The speaker phone module of claim 7 further comprising means for connecting the module to a peripheral accessory.

9. The speaker phone module of claim 7 wherein the peripheral accessory comprises an external data source.

10. The speaker phone module of claim 7 wherein the peripheral accessory comprises an external power source.

11. The speaker phone module of claim 7 wherein the connector comprises a twelve pin male connector.

12. The speaker phone module of claim 7 wherein the housing defines an l-shaped configuration wherein placement of the housing within a first position provides a first surface for supporting the base of a battery charger and placement of the housing in a second position provide a second surface for supporting the base of a cellular telephone.

13. A speaker phone module, comprising:
    a housing enclosing speaker phone circuitry for providing speaker phone capabilities to a cellular telephone;
    a speaker connected to the housing for broadcasting audio signals received from the cellular telephone;
    a microphone connected to the housing for processing speech for forwarding to the cellular telephone;
    a connector for electricity connecting the module to both the cellular telephone to a battery charger but not at the same time; and
    a cable for connecting the connector with the speaker phone circuitry.

14. The speaker phone module of claim 13 further comprising means for connecting the module to different types of peripheral accessories.

15. The speaker phone module of claim 13 wherein the peripheral accessories comprises an external data source.

16. The speaker phone module of claim 13 wherein the peripheral accessories comprises an external power source.

17. The speaker phone module of claim 13 wherein the connector comprises a twelve pin male connector.

18. A speaker phone module, comprising:

a housing defining a cradle for removably receiving either a battery charge or a cellular telephone, said housing enclosing speaker phone circuity, wherein the housing defines an L-shaped configuration wherein placement of the housing was at a first position provides a first surface for supporting the base of a battery and placement of the housing in a second position provides a second surface for supporting the base of a cellular telephone;

a speaker connected to the speaker phone circuity for broadcasting audio signals received from the cellular telephone within the cradle of the housing;

a microphone connected to the speaker phone circuity for processing and transmitting to the cellular telephone within the cradle of the housing;

a connector within the cradle for electrically connecting the speaker phone circuitry with either the cellular telephone or the battery charger.

19. A speaker phone module, comprising:

a housing defining a cradle for removably receiving a battery charger which is not a cellular telephone, said housing enclosing speaker phone circuitry;

a microphone connected to the speaker phone circuitry for receiving an audio signal to be transmitted to a cellular phone placed within the battery charger;

a speaker connected to the speaker phone circuitry for broadcasting audio signals received from the cellular phone placed within the battery charger; and means for electrically connecting the speaker phone module to the battery charger received within the cradle of the housing.

* * * * *

UNITED STATES PATENT AND TRADEMARK OFFICE
CERTIFICATE OF CORRECTION

PATENT : 6,035,221
DATED : March 7, 2000
INVENTOR(S): Tom Snyder et al.

It is certified that error appears in the above-identified patent and that said Letters Patent is hereby corrected as shown below:

| | |
|---|---|
| Column 3, line 28 | Replace "70" With --71-- |
| Column 5, line 3 | Replace "charge" With --charger-- |
| Column 5, line 4 | Replace "circuity" With --circuitry-- |
| Column 5, line 11 | Replace "circuity" With --circuitry-- |
| Column 5, line 14 | Replace "circuity" With --circuitry-- |

Signed and Sealed this

Fifteenth Day of May, 2001

Attest:

NICHOLAS P. GODICI

*Attesting Officer*    *Acting Director of the United States Patent and Trademark Office*